United States Patent Office 3,057,857
Patented Oct. 9, 1962

3,057,857
PROCESS FOR THE PRODUCTION OF α,β-DI-[IMIDAZYL-(2)]-ETHYLENES
Edgar Siegel, Leverkusen, Germany, assignor to Farbenfabriken Bayer Aktiengesellschaft, Leverkusen, Germany, a corporation of Germany
No Drawing. Filed Nov. 22, 1960, Ser. No. 70,926
Claims priority, application Germany Nov. 27, 1959
2 Claims. (Cl. 260—240)

The present invention relates to α,β-di-[imidazyl-(2)]-ethylenes; more particularly it concerns a process for the production of α,β-di-[imidazyl-(2)]-ethylenes which consists in eliminating sulfurous acid or bisulfites from α,β-di-[imidazyl-(2)-]-ethane-sulfonic acids of the general formula

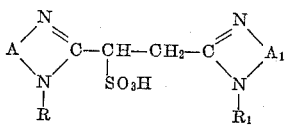

wherein A and $A_1$ denote the same or different, optionally substituted, aromatic or heterocyclic rings or condensed systems of such rings, in which two vicinal carbon atoms are linked to the two imidazole nitrogen atoms, and R and $R_1$ are, independently of each other, hydrogen or the same or different substituents, or from salts of the said α,β-di-[imidazyl-(2)]-ethane-sulfonic acids.

The elimination of sulfurous acid or of the bisulfites is conveniently carried out at temperatures above 80° C. in the presence of acid-binding agents, preferably in the presence of fused caustic alkalis, such as caustic soda or caustic potash, but alkali metal hydroxide solutions, the alkali metal salts of weak acids such as alkali metal acetates, carbonates, or phosphates, as well as organic bases are also suitable as acid-binding agents.

The α,β-di-[imidazyl-(2)]-ethane-sulfonic acids serving as starting materials are novel; they can be obtained, for example, by causing 1 mol of sulfosuccinic acid or 1 mol of a functional derivative of this acid, e.g. 1 mol of its carboxylic acid ester, to react with 2 mols of the same or different aromatic or heterocyclic o-diamines wherein one amino group is primary and the other amino group is primary or secondary. If different o-diamines are applied the reaction preferably takes place in two stages. o-Nitramines wherein the amino group is primary or secondary can also be reacted in place of the o-diamines with sulfosuccinic acid or its functional derivatives, and the imidazole ring closure can be effected in the resulting reaction product after reduction of the nitro group to the amino group in known manner.

The starting materials of the process according to the invention may be, e.g. the following aromatic o-diamines: o-phenylene-diamine, 1,2-diamino-4-methylbenzene, 1,2-diamino - 4 - isopropylbenzene, 1,2 - diamino - 4 - chlorobenzene, 1,2-diamino-4-methoxybenzene, 1,2-diamino-4-nitrobenzene, 3,4-diamino-benzoic acid, 3,4-diamino-benzene-sulfonic acid, 3,4-diamino-benzene-sulfonamide, 3,4-diaminodiphenyl, 3,4,3′,4′-tetra-aminodiphenyl, 1,2-naphthylenediamine, 1,2 - diamino - 5 - naphthol, 1,2-diamino-5-naphthol-7-sulfonic acid, 1,2-diaminonaphthalene-5,7-disulfonic acid, 1,2-diamino-8-naphthol-5-sulfonic acid, 1,2-diamino-anthraquinone, 1-amino-2-methyl-aminobenzene, 1 - amino - 2 - (β - hydroxyethylamino)-benzene, or 1-amino-2-methylamino-5-methylsulfonyl-benzene. As heterocyclic o-diamines there may be mentioned for instance 2,3-diaminopyrodine, 7,8-diamino-quinoline, 2,3-diaminoquinoxaline, 4,5-diaminouracil, 1,3-dimethyl-4,5-diaminouracil, or 2-phenyl-5,6-diamino-benzotriazole.

Prior to eliminating sulfurous acid or bisulfites from the α,β-di-[imidazyl-(2)]-ethane-sulfonic acids or their salts hydrogen atoms linked to the imidazole nitrogen atoms can be replaced by alkyl or aralkyl residues in known manner.

The process of the present invention allows the production of α,β-di-[imidazyl-(2)]-ethylenes which correspond to the general formula

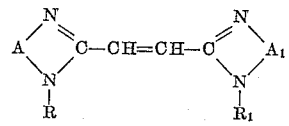

wherein A, $A_1$, R and $R_1$ have the above stated significance, and which can be employed as optical brightening agents or as intermediate products for the manufacture of dyestuffs in a particularly advantageous manner. The new process is more simple than the processes hitherto known wherein water is split off from α,β-di-[benzimidazyl-(2)]-monohydroxy-ethane compounds or wherein hydrogen is split off from α,β-di-[benzimidazyl-(2)]-ethane compounds. Compared with the known processes wherein α,β-di-[benzimidazyl-(2)]-ethylene compounds are prepared by condensing fumaric acid with o-phenylene diamines, the process of the invention has the advantage that the desired reaction products are obtained in purer form and at higher yield. This is surprising, above all due to the fact that it was not to be foreseen that the carbon-carbon double bond of the resulting ethylene derivatives would be stable towards fused caustic alkalis in spite of the presence of atmospheric oxygen.

The following examples serve to illustrate the invention without, however, limiting the scope thereof; the parts given are by weight.

Example 1

50 parts of the sulfuric acid salt of α,β-di-[benzimidazyl-(2)]-ethane-sulfonic acid of the formula

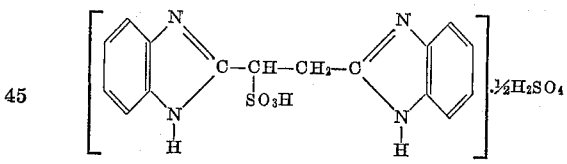

whose preparation is described below, are introduced with stirring at 200° C. during 20 minutes into a melt of 75 parts of caustic potash and 75 parts of caustic soda. The melt is thereafter heated to 220° C. for 2 minutes more and then dissolved in 500 parts of water whilst still warm. After the suspension thus obtained has been adjusted to pH 5–6 with concentrated hydrochloric acid, whilst stirring the precipitated product is filtered off when hot, washed with water, and whilst still wet, dissolved with warming in a mixture of 200 parts of alcohol and 40 parts of 45% sodium hydroxide solution. After being clarified with charcoal, the solution is adjusted to pH 5 by addition of hydrochloric acid, and the precipitated product is filtered, washed first with alcohol and then with water, and dried. 29 parts of almost colourless α,β-di-[benzimidazyl-(2)]-ethylene of the formula

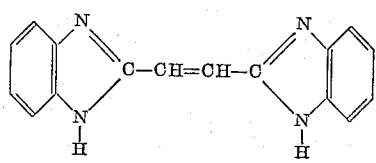

which is soluble in a mixture of alcohol and sodium hydroxide solution, are obtained in a very pure form.

The sulfuric acid salt of α,β-di-[benzimidazyl-(2)]-ethane-sulfonic acid was prepared in the following manner:

A solution of 116 parts of maleic acid in a mixture of 177 parts of 45% sodium hydroxide solution and 30 parts of water was treated during 10 minutes with 285 g. of a 40% solution of technical sodium bisulfite, whereupon the mixture warms up to boiling spontaneously. After the mixture has been heated to boiling at 105° C. for another 20 minutes whilst cooling under reflux, it was treated with 153 parts of concentrated sulfuric acid, and stirred at 105° for about 10 minutes until no further smell of sulfur dioxide was noted. After the addition of 400 parts of water and of further 415 parts of concentrated sulfuric acid, the clear solution is treated with 220 parts of o-phenylenediamine and heated to boiling for 48 hours in an atmosphere of nitrogen whilst cooling under reflux. The separated crystalline condensation product is filtered off from the reaction solution when still hot at 80° C., washed with water until sideproducts of blue colour have been removed, and then dried at 100° C.

To eliminate sulfurous acid from the above specified sulfate of α,β-di-[benzimidazyl-(2)]-ethane-sulfonic acid, it is also possible to proceed by heating 50 parts of the sulfate to the boil with 450 parts of 50% potassium hydroxide solution for 6 hours whilst cooling under reflux, or by heating to 170° C. for 1 hour in a stirrer autoclave. After being diluted with water, the reaction mixtures are then worked up in the above described manner. In this case, also, there is obtained very pure α,β-di-[benzimidazyl-(2)]-ethylene in high yield.

Another mode of operation consists in that a mixture of 50 parts of the above specified sulfate, 200 parts of water and 300 parts of trisodium phosphate is heated to 200° C. in a stirrer autoclave for 1 hour; the reaction mixture is then diluted with 1000 parts of water, the precipitated α,β-di-[benzimidazyl-(2)]-ethylene is filtered off, and reprecipitated from alcohol as described above. The product obtained by this method in excellent yield is also very pure.

Finally, the elimination of sulfurous acid from the above-described sulfate of α,β-di-[benzimidazyl-(2)]-ethane-sulphonic acid can also be effected by introducing 50 parts of the sulfate into 300 parts of fused anhydrous sodium acetate at 290° C. in the course of 3 to 5 minutes; after cooling the melt is dissolved in water, and the crude reaction product is reprecipitated with hydrochloric acid from alcoholic sodium hydroxide solution.

*Example 2*

50 parts of α,β-di-[6-methyl-benzimidazyl-(2)]-ethane-sulfonic acid of the formula

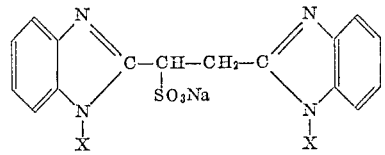

are introduced during 15 minutes into a melt of 75 parts of caustic potash and 75 parts of caustic soda at 200° C., with stirring; the melt is dissolved in 500 parts of water whilst still warm, and the resulting suspension is adjusted to pH 5–6 by the addition of hydrochloric acid. The separated α,β-di-[6-methyl-benzimidazyl-(2)]-ethylene is filtered off, dissolved with warming in a mixture of 250 parts of alcohol and 45 parts of 45% sodium hydroxide solution; the hot solution is clarified with charcoal, diluted with 300 parts of hot water, and whilst hot adjusted to pH 5 with hydrochloric acid. The precipitated reaction product is filtered off, washed with water and alcohol, and then dried at 100° C. There are obtained 35 parts of α,β-di-[6-methyl-benzimidazyl-(2)]-ethylene of the formula

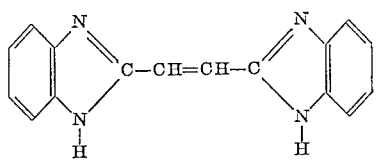

The α,β - di - [6 - methyl-benzimidazyl - (2)] - ethane-sulfonic acid was prepared in the following manner:

A solution of 116 parts of maleic acid in a mixture of 310 parts of 10 N potassium hydroxide solution and 100 parts of water was treated at 60° with 122 parts of potassium metabisulfite, whereupon the temperature rose to the boil spontaneously after a short while. After the reaction mixture had been heated to boiling for another 20 minutes, whilst cooling under reflux, it was treated with 153 parts of concentrated sulfuric acid, stirred at 100–105° C. for 10 minutes, then diluted with 400 parts of water, treated with further 415 parts of concentrated sulfuric acid as well as with 250 parts of 1,2-diamino-4-methylbenzene, and stirred at 150° C. for another 10 hours in an autoclave in an atmosphere of nitrogen. After cooling, the crystallised product is filtered off, washed with water, and dissolved in 5000 parts of hot water, at pH 10 by the addition of 45% sodium hydroxide solution. The hot solution is freed by impurities by filtration, and after cooling the filtrate is adjusted to pH 5 by the addition of hydrochloric acid. The α,β-di-[6-methyl-benzimidazyl(2)] - ethane - sulfonic acid thereby separating in the form of a crystalline powder was filtered off, washed with water, and dried at 100° C.

*Example 3*

50 parts of the sodium salt of N-monomethyl-α,β-di-[benzimidazyl-(2)]-ethane-sulfonic acid of the formula

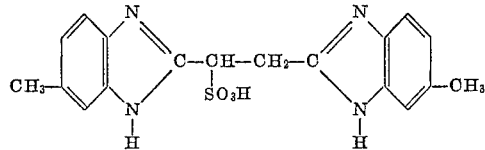

wherein one of the two residues X represents the methyl group and the other hydrogen, are introduced during 15 minutes into a melt of 75 parts of caustic potash and 75 parts of caustic soda at 200° C. with stirring; the melt is dissolved in 500 parts of water whilst still warm, and adjusted to pH 4 with hydrochloric acid. The reaction product separating from the hot solution is filtered off, washed first with water and then with alcohol, and thereafter dried.

There are obtained 38 parts of N-monomethyl-α,β-di-[benzimidazyl-(2)]-ethylene of the formula

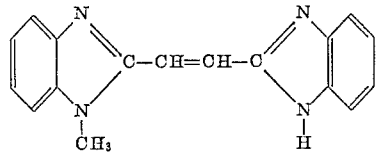

in a pure state.

The sodium salt of N-monomethyl-α,β-di-[benzimidazyl-(2)]-ethane-sulfonic acid was prepared in the following manner:

The procedure was at first as specified in the second part of Example 2, except for the difference that in place of the 250 parts of 1,2-diamino-4-methylbenzene employed there, use was made of 220 parts of o-phenylenediamine. The α,β-di-[benzimidazylol-(2)] - ethane - sulfonic acid was then dissolved in 200 parts of water, at pH 10 by the addition of 45% sodium hydroxide solution, and after addition of further 11 parts of 45% sodium hydroxide solution, it was treated dropwise, whilst stirring, with 15 parts of dimethyl sulfate at 40–45° C. during 1

Example 4

A mixture of 50 parts of α,β-di-[N-methyl-benzimidazyl-(2)]-ethane-sulfonic acid of the formula

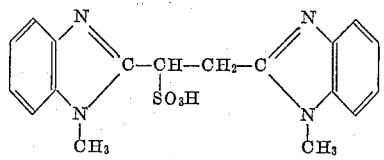

whose preparation is described below, 300 parts of bisodium phosphate (Na₃PO₄·12H₂O) and 200 parts of water were heated to 180° C. in a stirrer autoclave for 1 hour. Thereupon the mixture whilst still warm was diluted with 1000 parts of water and the reaction product which precipitates in the form of coarse crystals was filtered off, washed with water and dried. 32 parts of α,β-di-[N-methyl - benzimidazyl - (2)] - ethylene of the formula

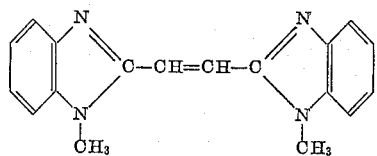

were obtained in a pure state.

The α,β-di-[N-methyl - benzimidazyl - (2)] - ethane-sulfonic acid was obtained in the following manner:

The procedure was at first as specified in the second part of Example 2, except for the difference that in place of the 250 parts of 1,2-diamino-4-methylbenzene employed there, use was made of 220 parts of o-phenylene-diamine. 35 parts of the α,β-di-[benzimidazyl-(2)]-ethane-sulfonic acid which was precipitated from its alkaline solution by the addition of hydrochloric acid and dried were dissolved in 100 parts of water at pH 10 by the addition of 45% sodium hydroxide solution and after the addition of further 22 parts of 45% sodium hydroxide solution 30 parts of dimethyl sulfate were added dropwise within 2 hours at 40–45° C. with stirring; thereupon the reaction mixture was stirred for a further 30 minutes at 30–40° C. and adjusted to pH 4 by the addition of hydrochloric acid. The methylated product was precipitated in crystalline form, filtered off, washed with water and methanol and dried at 100° C. 37.5 parts of α,β-di-[N-methylbenzimidazyl-(2)]-ethane-sulfonic acid were obtained.

Example 5

50 parts of the sulfuric acid salt of α,β-di-[7-methyl-benzimidazyl-(2)]-ethane-sulfonic acid of the formula

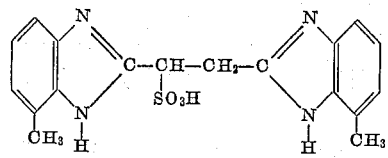

were introduced with stirring at 200° C. during 15 minutes into a melt of 75 parts of caustic potash and 75 parts of caustic soda. The warm melt was dissolved in 500 parts of water and the pH of the suspension thus obtained was adjusted to 5–6. The precipitated α,β-di-[7-methyl-benzimidazyl-(2)]-ethylene was filtered off and dissolved when warming in a mixture of 250 parts of alcohol and 45 parts of 45% sodium hydroxide solution; the hot solution was clarified with charcoal, diluted with 300 parts of water and whilst hot adjusted to pH 5 with hydrochloric acid. The precipitated reaction product was filtered off, washed with water and alcohol and then dried at 100° C. There were obtained 25 parts of α,β-di-[7-methylbenzimidazyl - (2)] - ethylene of the formula

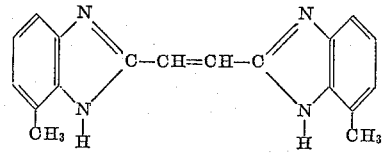

in pure state.

The α,β-di-[7 - methyl - benzimidazyl - (2)] - ethane-sulfonic acid was prepared in the following manner:

122 parts of potassium meta-bisulfite were added to a solution of 116 parts of maleic acid in a mixture of 310 parts of 10 N potassium hydroxide solution and 100 parts of water at 60° C. The temperature rose to the boil spontaneously after a short while. After the reaction mixture had been heated to the boil for another 20 minutes whilst cooling under reflux it was treated with 153 parts of concentrated sulfuric acid, stirred at 100–105° C. for 10 minutes, diluted with 400 parts of water, treated with further 220 parts of concentrated sulfuric acid as well as with 400 parts of 1,2-diamino-3-methyl-benzene-dihydrochloride and stirred at 150° C. for another 10 hours in an autoclave. After cooling, the reaction mixture was stirred with 1000 parts of water, and the reaction product was filtered off, washed with water and dried.

If instead of the above mentioned 400 parts of 1,2-diamino-3-methyl-benzene-dihydrochloride 450 parts of 1,2-diamino-3,5-dimethyl-benzene - dihydrochloride were applied in the procedure described above, the α,β-di-[5,7-dimethylbenzimidazyl-(2)]-ethylene of the formula

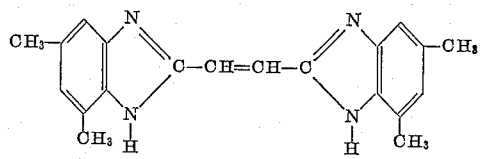

was obtained in pure form.

Example 6

50 parts of α,β-[benzimidazyl-(2)]-[7-methyl-benzimidazyl-(2)]-ethane-sulfonic acid of the formula

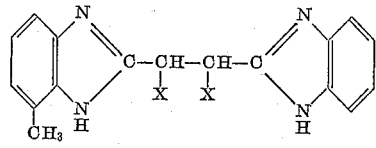

wherein one of the two radicals X stands for the sulfonic acid group, whereas the other stands for hydrogen, are introduced during 15 minutes into a melt of 75 parts of caustic potash and 75 parts of caustic soda at 200° C. with stirring. The melt is dissolved in 500 parts of water whilst still warm, and the reaction mixture is adjusted to pH 4 by the addition of hydrochloric acid. The product separated from the hot solution is filtered off, washed with water and with alcohol and dried. 33 parts of α-[benzimidazyl-(2)]-β-[7-methyl-benzimidazyl-(2)]-ethylene of the formula

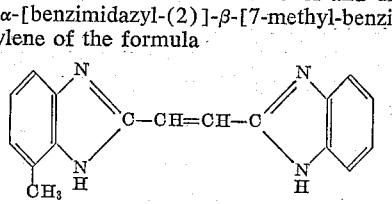

are obtained in pure form.

The α,β-[benzimidazyl-(2)]-[7-methyl - benzimidazyl-(2)]-ethane-sulfonic acid was prepared in the following manner:

The procedure was at first as specified in the second part of Example 5 except for the difference that in place of 400 parts of 1,2-diamino-3-methylbenzene-dihydrochloride only 80 parts of this compound were added. The reaction product was filtered off, washed with water and dissolved in 400 parts of water at pH 11 by the addition of sodium hydroxide solution; the hot solution was clarified with charcoal and adjusted to pH 2-3 with hydrochloric acid. The precipitated reaction product of the formula

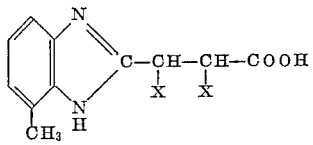

wherein one of the two radicals X stands for the sulfonic acid group, whereas the other stands for hydrogen, was filtered off, washed with water and dried. 66 parts of this β-[7-methyl-benzimidazyl-(2)]-sulfo - propionic acid were stirred with 27 parts of o-phenylene diamine, 235 parts of water and 155 parts of concentrated sulfuric acid during 10 hours in an autoclave at 150° C. The bluish-green crystalline reaction product was stirred with hot diluted hydrochloric acid in order to remove the o-phenylene diamine in excess and was filtered off whilst still warm. The residue was dissolved in water at pH 10 by the addition of sodium hydroxide solution, clarified with charcoal, and the filtrate was adjusted to pH 5 with acetic acid. The precipitated α,β - [benzimidazyl - (2)] - [7-methyl-benzimidazyl-(2)]-ethane-sulfonic acid was filtered off, washed with water and dried.

*Example 7*

50 parts of the sulfuric acid salt of α,β-di-[2',3'-naphthimidazyl-(2)]-ethane-sulfonic acid of the formula

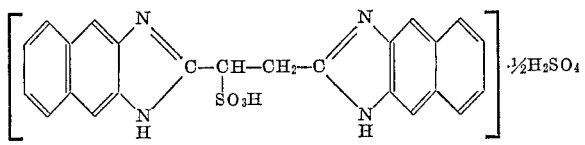

are introduced with stirring at 200° C. during 20 minutes into a melt of 75 parts of caustic potash and 75 parts of caustic soda. The melt is thereafter heated to 220° C. for 2 minutes and then dissolved in 500 parts of water whilst still warm. After the suspension thus obtained has been adjusted to pH 5–6 with concentrated hydrochloric acid whilst stirring, the precipitated product is filtered off when hot, washed wtih water, dissolved in a mixture of alcohol and diluted sodium hydroxide solution. The solution is clarified and adjusted to pH 5 by the addition of hydrochloric acid. The precipitate is filtered off, washed and dried. 22 parts of [2',3'-naphthimidazyl-(2)]-ethylene of the formula

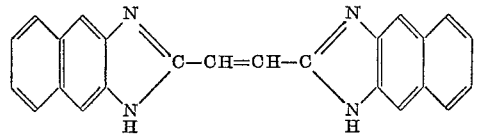

are obtained in pure form.

The sulfuric acid salt of α,β-di[2',3'-naphthimidazyl-(2)]-ethane-sulfonic acid was obtained in the following manner:

A solution of 116 parts of maleic acid in a mixture of 177 parts of 45% sodium hydroxide solution and 30 parts of water was treated during 10 minutes with 285 parts of a 40% solution of technical sodium bisulfite whereupon the mixture warmed up to boiling spontaneously. After the mixture had been heated to the boil at 105° C. for another 20 minutes with cooling under reflux, it was treated with 153 parts of concentrated sulfuric acid and stirred at 105° C. for about 10 minutes until no further smell of sulfur dioxide could be observed. After addition of 400 parts of water and of further 415 parts of concentrated sulfuric acid the clear solution was treated with 322 parts of 2,3-naphthylene diamine and heated to the boil for 12 hours. The separated crystalline reaction product was filtered off from the reaction solution after cooling, washed with water and dried at 100° C.

*Example 8*

A warm aqueous solution of 20 parts of the sodium salt of N-mono-(β-hydroxyethyl)-α,β-di-[benzimidazyl - (2)] ethane-sulfonic acid of the formula

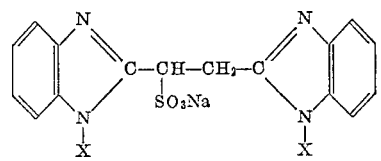

wherein one of the two radicals X stands for the β-hydroxyethyl group and the other for hydrogen, is dropped with stirring during 15 minutes into 151 parts of boiling 15% potassium hydroxide solution in such a manner that the temperature of the reaction mixture is 140–143° C. and that the water serving as solvent is continuously distilled off. The reaction mixture is then diluted with 400 parts of water, and the precipitated potassium salt of N-mono-(β-hydroxyethyl)-α,β-[benzimidazyl - (2)] - ethylene of the formula

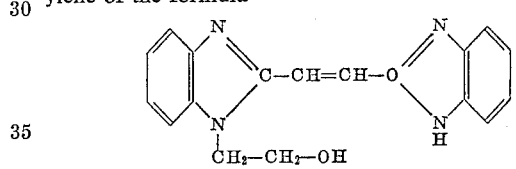

is filtered off, washed with water and dried at 100° C.

The aqueous solution of 20 parts of the sodium salt of N-mono-(β-hydroxyethyl)-α,β-di-[benzimidazyl - (2)]-ethane-sulfonic acid was prepared in the following manner:

17.1 parts of α,β-di-[benzimidazyl-(2)]-ethane-sulfonic acid obtained, for instance, according to the second part of Example 4 were dissolved in 100 parts of water with the addition of 45% sodium hydroxide solution at pH 9. This solution was then treated dropwise with stirring during 2 hours with a solution of 4.1 parts of ethylene chlorohydrine in 10 parts of water, and the reaction mixture was stirred during further 2–3 hours at 80–90° C.; during the whole time the pH-value was kept to 9 by the addition of sodium hydroxide solution. The solution of the sodium salt of N-mono-(β-hydroxyethyl)-α,β-di-[benzimidazyl-(2)]-ethane-sulfonic acid thus obtained was then whilst still warm directly dropped into the boiling 50% potassium hydroxide solution as indicated above.

I claim:

1. A process for the production of alpha, beta-di-[imidazyl-(2)]-ethylenes comprising reacting a compound having the formula

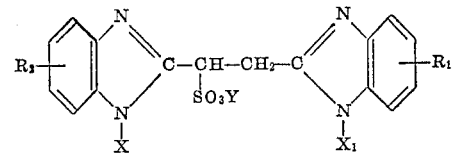

wherein X and $X_1$ comprise a radical selected from the group consisting of H, lower alkyl, and lower hydroxy alkyl, $R_1$ and $R_2$ comprise a radical selected from the group consisting of H, lower alkyl, halogen, methoxy, carboxylic, methylsulfonic, and a napthalene residue connected at the 5 and 6 position of the benzene ring, and Y is a radical selected from the group consisting of —H and an alkali metal, with an alkali metal reagent selected from the group consisting of a caustic alkali, an alkali metal salt of a weak acid, an aqueous solution of an alkali metal hydroxide, and an aqueous solution of an alkali metal salt of a weak acid, within a temperature range of from about 100–300° C.

2. A process according to claim 1 in which alpha, beta-di-[imidazyl-(2)-ethane sulfonic acids and their salts are treated in aqueous solution with a member selected from the group consisting of an alkylating agent and an aralkylating agent prior to heating with the alkali metal reagent.

References Cited in the file of this patent

FOREIGN PATENTS 814,249    Great Britain _____ June 3, 1959

OTHER REFERENCES

Backer et al.: Rec. Trav. Chim., vol. 40, pages 590–2 (1921).

Chemical Abstracts, vol. 19, cols. 37–8 (1925).

Wagner et al.: Journ. of the Am. Chem. Soc., vol. 53, pages 3407–3413 (1931).